(12) United States Patent
Bekooij et al.

(10) Patent No.: US 8,918,786 B2
(45) Date of Patent: Dec. 23, 2014

(54) GENERATING SIMULATED STALL SIGNALS BASED ON ACCESS SPEED MODEL OR HISTORY OF REQUESTS INDEPENDENT OF ACTUAL PROCESSING OR HANDLING OF CONFLICTING REQUESTS

(75) Inventors: Marco J. G. Bekooij, 'S Hertogenbosch (NL); Jan W. Van Den Brand, Eindhoven (NL)

(73) Assignee: NXP, B.V., Eindhoven (NL)

( * ) Notice: Subject to any disclaimer, the term of this patent is extended or adjusted under 35 U.S.C. 154(b) by 1229 days.

(21) Appl. No.: 12/531,737

(22) PCT Filed: Mar. 26, 2008

(86) PCT No.: PCT/IB2008/051121
§ 371 (c)(1),
(2), (4) Date: Sep. 17, 2009

(87) PCT Pub. No.: WO2008/117246
PCT Pub. Date: Oct. 2, 2008

(65) Prior Publication Data
US 2010/0138839 A1   Jun. 3, 2010

(30) Foreign Application Priority Data
Mar. 28, 2007   (EP) ..................................... 07105130

(51) Int. Cl.
*G06F 9/44*    (2006.01)
*G06F 9/46*    (2006.01)
*G06F 9/52*    (2006.01)
*G06F 9/22*    (2006.01)
*G06F 12/00*   (2006.01)
*G06F 13/00*   (2006.01)

(52) U.S. Cl.
CPC ....................................... *G06F 9/52* (2013.01)

USPC ........... 718/100; 718/101; 711/147; 711/150; 711/163; 711/167; 711/168; 710/52; 710/107; 710/240; 710/241; 710/244

(58) Field of Classification Search
None
See application file for complete search history.

(56) References Cited

U.S. PATENT DOCUMENTS 5,280,608 A * 1/1994 Beaverson et al. ............. 714/34
5,509,136 A * 4/1996 Korekata et al. ............. 711/151
(Continued)

FOREIGN PATENT DOCUMENTS

WO          9729432  A1     8/1997

OTHER PUBLICATIONS

Douceur, J. R., et al; "Progress-Based Regulation of Low-Importance Processes"; Proceedings fo the ACM Symposium on Operating Systems Principles, XX, XX; vol. 33, No. 5; Dec. 19, 1999; pp. 247-260; XP002155760.

*Primary Examiner* — Emerson Puente
*Assistant Examiner* — Benjamin Wu

(57) ABSTRACT

A multiprocessing system executes a plurality of processes concurrently. A process execution circuit (10) issues requests to access a shared resource (16) from the processes. A shared access circuit (14) sequences conflicting ones of the requests. A simulating access circuit (12) generates signals to stall at least one of the processes at simulated stall time points selected as a predetermined function of requests from only the at least one of the processes and/or the timing of the requests from only the at least one of the processes, irrespective of whether said stalling is made necessary by sequencing of conflicting ones of the requests. Thus, part from predetermined maximum response times, predetermined average timing can be guaranteed, independent of the combination of processes that is executed.

15 Claims, 2 Drawing Sheets

(56) References Cited

U.S. PATENT DOCUMENTS

| | | | |
|---|---|---|---|
| 6,052,798 A * | 4/2000 | Jeddeloh | 714/6.13 |
| 6,226,713 B1 * | 5/2001 | Mehrotra | 711/118 |
| 6,594,748 B1 * | 7/2003 | Lin | 711/167 |
| 6,810,475 B1 * | 10/2004 | Tardieux | 712/219 |
| 6,829,689 B1 * | 12/2004 | Van Dyke | 711/167 |
| 6,892,289 B2 * | 5/2005 | Moss | 711/167 |
| 7,308,540 B2 * | 12/2007 | Leijten | 711/149 |
| 2003/0196058 A1 * | 10/2003 | Ramagopal et al. | 711/169 |
| 2004/0064675 A1 * | 4/2004 | Jahnke | 712/1 |
| 2005/0177689 A1 * | 8/2005 | Leijten | 711/149 |
| 2005/0278510 A1 * | 12/2005 | Jacobs et al. | 712/218 |
| 2006/0136919 A1 * | 6/2006 | Aingaran et al. | 718/100 |
| 2008/0320240 A1 * | 12/2008 | Savic | 711/151 |
| 2009/0070524 A1 * | 3/2009 | Wood et al. | 711/105 |
| 2009/0164689 A1 * | 6/2009 | Luba et al. | 710/305 |

* cited by examiner

GENERATING SIMULATED STALL SIGNALS BASED ON ACCESS SPEED MODEL OR HISTORY OF REQUESTS INDEPENDENT OF ACTUAL PROCESSING OR HANDLING OF CONFLICTING REQUESTS

FIELD OF THE INVENTION

The invention relates to multiprocessing, and more particularly to handling of resource conflicts between different processes in a multiprocessing system or method.

BACKGROUND OF THE INVENTION

Resource conflicts are a well-known problem in multiprocessing systems. In a multiprocessing system a plurality of data handling processes is executed concurrently. When the different processes need to access a main memory or other resources, a resource conflict may arise. Such a conflict must be resolved by allowing the accesses to proceed successively, causing some of the accesses to wait with the effect that the requesting process may have to wait as well.

Process timing is an important consideration in the resolution of access conflicts. In many applications real-time requirements are imposed on processes, which means that the processes need to complete, or perform specified actions, before specified time points. When such a real-time process is executed together with other processes with unknown access timing, the unpredictability of resource conflicts with the other processes can make it impossible to guarantee real-time performance, even when it is known that real-time performance is possible, or indeed occurs most of the time.

A number of conflict resolution schemes is known that address real time guarantees. A simple scheme divides time into successive resource access time slots that are assigned to predetermined ones of the processes. If a process issues access requests, the requests will be executed in resource access time slot that are assigned to the process. Effectively, the process "sees" the resource as if it operates at the rate of the assigned time slots. If this visible resource is fast enough, real-time performance of the process can be guaranteed, independent of the behavior of other processes.

Other conflict resolution schemes use arbitration. An arbiter circuit receives the requests from different processes and in each resource access time slot where there is a conflict, the arbiter circuit selects the request of one of the processes and allows that request to be handled. With such an arbiter circuit real-time performance can be guaranteed in various ways, for example by using a variable priority ranking of the processes, so that each process will get highest priority within a predetermined time interval. If the process does not issue a request, a lower priority process will get access instead, so that the resource may be used more frequently.

Such allocation schemes impose limits on the maximum time within which a process will get access to a resource. This guaranteed maximum is independent of other processes. As a result there is also a limit on the maximum delays before real time actions will be performed during execution of the process, provided that the process itself is sufficiently predictable to ensure that no more than certain maximum numbers of execution cycles are needed before the actions are performed.

For processes that are not sufficiently predictable, for example because the number of execution cycles depends on the value of its input data, no such real time guarantees can be given, even if there are limits on the access time. For such processes arbitration schemes that limit the maximum resource access time do not add to predictability. Nevertheless it is desirable that also the timing of such processes is predictable at least in terms of average timing that is averaged over different data inputs.

Unfortunately, real time resource allocation schemes that guarantee only a maximum limit on access time do not have the effect that they make this average timing independent of other processes that are executed concurrently. When there happen to be fewer or more conflicts with other processes the average time will be faster or slower. This speed effect could be removed by including instructions in the programs for performing the processes to wait, if the speed has been too high, but this may unnecessarily decreases progress of the process.

SUMMARY OF THE INVENTION

Among others, it is an object to make it possible to ensure predictable average timing of at least one process that is executed concurrently with one or more other processes that have access to a shared resource.

A multiprocessing system according to claim 1 is provided. Herein timing of resource access related stalls of at least one of a plurality of processes is controlled by a simulation circuit irrespective of whether said stalling is made necessary by sequencing of conflicting ones of the requests. The actual accesses are handled by an access circuit that sequences conflicting requests from different processes. As a result, when there are only a few or no conflicts, the accesses may be handled at a speed that makes accesses superfluous. Nevertheless the simulation circuits may generate stalls even in this case. In an embodiment the simulation circuit uses a predetermined function to select stall timing according to an access speed model corresponding to worst case conflict conditions, or even slower access, to select simulated stall timing.

The shared resource may be a shared memory. It may be part of the system, or the system may merely be suitable to connect the shared resource at some later time.

The access circuit may sequence access requests for example using a fixed time slot allocation scheme, or according to a round robin scheme or any other conflict resolution scheme. Preferably, a scheme is used that guarantees a maximum delay time interval before the next request from a process is handled. In an embodiment it is not needed that all requests from a process be handled in such a time interval: unpredictable maximum delays due to conflicts are acceptable, as long as they result from conflicts between access requests from the same process.

In an embodiment the simulation circuit comprises a buffer for indications of the requests from the at least one of the processes only. In this embodiment the simulation circuit selects the stall time point as a function of a simulated response to requests indicated in the buffer. Thus, the history of requests from a process may be used to generate stalls, or stalls related to a request may be influenced by later arriving requests from the process (e.g. higher priority requests). In an embodiment the buffer has capacity for only a single pending request. In a further embodiment the buffer has capacity for a plurality of requests. In another embodiment comprises a plurality of buffers for indications of requests of different priority in order to select stall timing. Thus a more refined selection of stall timing is possible, with fewer unnecessary stalls.

In an embodiment the simulation circuit comprises a response buffer. Herein a response to the request from the access circuit may be buffered until a delivery time point selected by the simulation circuit. This may be used in the case of read requests for example. For other requests, such as write requests response buffering may not be needed.

In a further embodiment the system may comprises a plurality of simulation circuits, each configured to select stall timing for a respective one of the processes. Simulation circuits may be provided for all processes, or alternatively only for a part of the processes where predictable average timing required. In a further embodiment different predetermined may be used by different simulation circuits. Thus, different processes may be provided with different predictable access performance, such as high speed and low speed access performance.

BRIEF DESCRIPTION OF THE DRAWING

These and other objects and advantages will become apparent from a description of exemplary embodiments, using the following drawings.

DETAILED DESCRIPTION OF EMBODIMENTS

Figure 1:
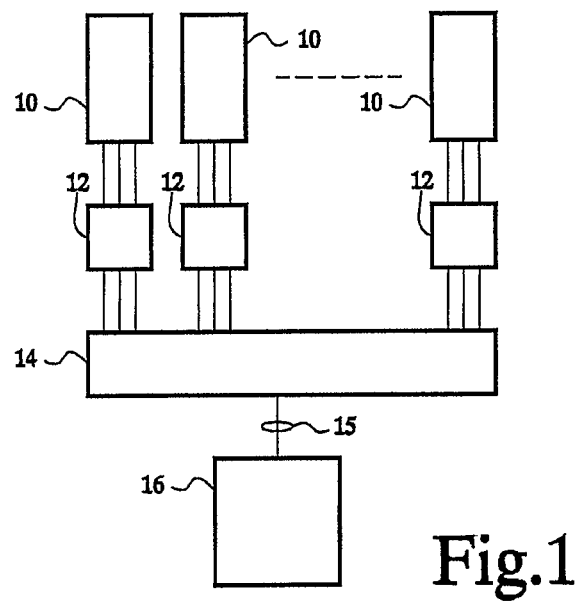
FIG. 1 shows a multiprocessor system.

FIG. 1 shows a multiprocessor system, comprising a plurality of processors 10, a plurality of processor specific access circuits 12, a shared access circuit 14, and a shared resource 16. By way of example three processors 10, and three processor specific access circuits 12 are shown, but any number, e.g. two, four or more may be used. Together processors form a (multi-)process execution circuit. Each processor 10 is coupled to a corresponding one of the processor specific access circuits 12 and each processor specific access circuit 12 is coupled to shared access circuit 14. Shared access circuit 14 is coupled to shared resource 16 via an interface 15. In an embodiment, shared resource 16 is a main memory, but in other embodiment it may another type of resource, such as a communication bus, an input/output device, a special function device such as a DCT transform computation circuit or image block matching circuit etc. The plurality of processors may be implemented in an integrated circuit together with the access circuits. In this case interface 15 may be an external interface of the integrated circuit, shared resource 16 being external to the integrated circuit. Alternatively shared resource 16 may be internal, interface 15 being internal, or part or all of the components may be implemented in different integrated circuits.

In operation each processor 10 executes a respective process, wherein it executes instructions of a program in temporally successive execution cycles. Execution of some of the instructions may involve access to shared resource 16. In different embodiments various forms of access may be needed. When shared resource 16 is a memory, for example, load and store instructions may require data to be written to and read from shared resource 16. In an embodiment wherein processors 10 comprise cache memories, some load and store instructions may cause write back or fetch operations to be performed, which involve data transfer between the cache memory and share resource 16.

When a processor 10 needs to perform access to shared resource 16 it issues a request signal to do so to its processor specific access circuit 12. In an embodiment processes are used wherein the timing of the request signals is data dependent. The processor specific access circuit 12 passes the request signals to shared access circuit 12, which in turn passes the request signals from the processor specific access circuits 12 of all processors to shared resource 16. If the request involves the transfer of data back to processors 10, shared access circuit 14 passes the data from shared resource to the relevant processor specific access circuit 12, from where it is passed to the relevant processor 10.

Processor specific access circuit 12 has a stall control output coupled back to its corresponding processor 10. Under predetermined conditions specific access circuit 12 outputs a signal to its corresponding processor 10 to cause its corresponding processor 10 to stall (suspend operation). Likewise shared access circuit 14 has stall control outputs coupled to processor specific access circuits 12.

Processor specific access circuit 12 are configured to generate stall signals to their corresponding processors 10 independent of stall signals from shared access circuit 14. Thus, processor specific access circuit 12 may be seen as a simulating access circuit that simulates stalls that would occur where only one processor has access to a lower performance version of resource 16, by generating stalls at time points corresponding that would be made necessary by the simulated resource, rather than by real conditions that make a stall indispensable using the shared resource.

Figure 2:
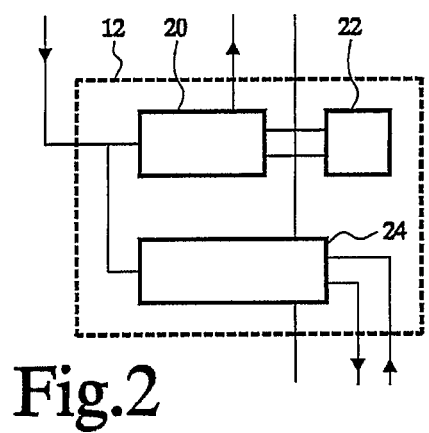
FIG. 2 shows an embodiment of a processor specific access circuit.

FIG. 2 shows an embodiment of a processor specific access circuit 12, that acts as such a simulating access circuit, comprising a first request buffer circuit 20, a resource simulation circuit 22 and a second request buffer circuit 24. A request input of processor specific access circuit 12 from its corresponding processor (not shown) is coupled to inputs of the first and second request buffer circuits 20, 24. The first request buffer circuit 20 is coupled to resource simulation circuit 22. The second request buffer circuit 24 is coupled to an input/outputs of processor specific access circuit 12 that are coupled to the shared access circuit (not shown).

In operation, processor specific access circuit 12 receives access requests from its processor 10 and buffers these requests in both first and second request buffer circuits 20, 24. From first buffer circuit 20 the requests are passed to resource simulation circuit 22, which returns control signals simulating handling of the requests, without necessarily receiving or returning data involved in the requests. Resource simulation circuit 22 uses a deterministic allocation scheme to generate the control signals dependent on the simulated behavior of resource simulation circuit 22, but independent of the shared access circuit 14, the other processors 10 and the processor specific access circuits 12 of the other processors. On the basis of the control signals first buffer circuit 20 generates stall signals to the corresponding processor 10. From second buffer circuit 24 the requests are passed to shared access circuit 14, which allocates shared resource 16 to the request and returns response data in response to the request if necessary. Second buffer circuit 24 forwards the response data to the corresponding processor 10 of the processor specific access circuit 12.

The processor specific access circuit 12 separates stall signal generation and actual request handling. The stall signals are generated as if the requests were processed by resource simulation circuit 22. The requests are handled via second buffer circuit 24 and shared access circuit 14 and response data is returned from second buffer circuit 24 and shared access circuit 14 if necessary. As may be appreciated this embodiment of processor specific access circuit 12 has the effect that it generates stall signals to its corresponding processor 10 independent of allocation by shared access circuit 14.

Although resource simulation circuit 22 operates independently of the shared access circuit 14, the other processors 10 and the processor specific access circuits 12 of the other processors, the allocation scheme that it uses to generate its simulated performance is configured to comply with worst-case performance by shared access circuit 12. Thus, it is ensured that no unacceptable conditions will arise in second buffer circuit 24.

Figure 3:
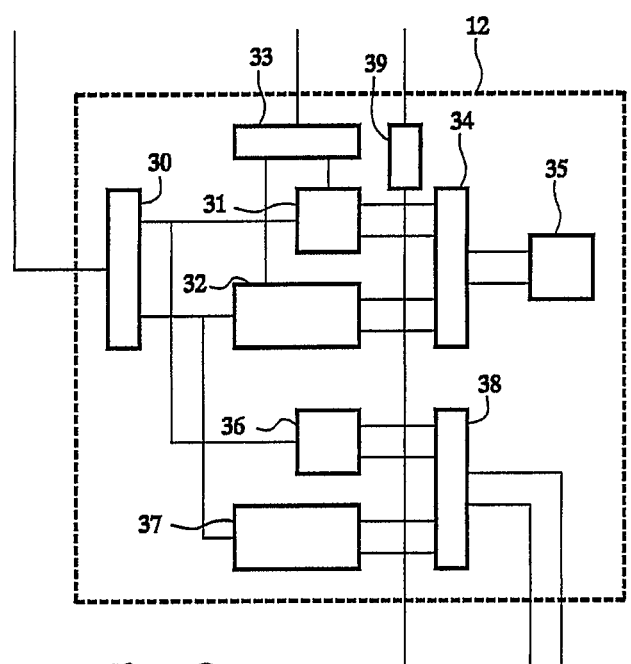
FIG. 3 shows an embodiment of a processor specific access circuit of FIG. 2.

FIG. 3 shows an embodiment of a processor specific access circuit 12 of FIG. 2 wherein read and write request buffers are used. In this embodiment processor specific access circuit 12 comprises a distributor 30, a first read request buffer 31, a first write request buffer 32, a stall signal generator 33, a first request multiplexer 34 and a resource simulation circuit 35. Distributor 30 has an input coupled to a request output of the corresponding processor (not shown) and outputs coupled to first read request buffer 31 and first write request buffer 32. First read request buffer 31 and first write request buffer 32 are coupled to first request multiplexer 34 and to a stall signal generator 33. First request multiplexer 34 is coupled to resource simulation circuit 35.

In operation distributor 30 sends incoming read requests to first read request buffer 31 and incoming write requests to first write request buffer 31. First request multiplexer 34 transmits requests from first read request buffer 31 and first write request buffer 32 to resource simulation circuit 35. First request multiplexer 34 gives priority to read requests: if there are read requests in first read request buffer 31 these will be transmitted first. First request multiplexer 34 transmits write requests from first write request buffer 32 to resource simulation circuit 35 only when there are no pending read requests.

Stall signal generator 33 generates stall signals when first read request buffer 31 or first write request buffer 32 is full and a new request for the full buffer is received. In an embodiment the read requests implicitly or explicitly indicate a time of delivery at which data should be supplied to the processor in response to the request. In this embodiment stall signal generator 33 also generates stall signals at the indicated times when the requested data is not yet available according to resource simulation circuit 35.

Furthermore, processor specific access circuit 12 comprises a second read request buffer 36, a second write request buffer 37, a second request multiplexer 38 and a read data buffer 39. The outputs of distributor 30 are coupled to second read request buffer 36 and second write request buffer 37. Second read request buffer 36 and second write request buffer 37 are coupled to second request multiplexer 38. Second request multiplexer 38 is coupled to the shared access circuit (not shown). Read data buffer 39 has an input coupled to the shared access circuit (not shown) and an output coupled to the processor (not shown).

In operation distributor 30 sends the incoming read requests also to second read request buffer 36 and incoming write requests also to second write request buffer 37. Second request multiplexer 38 transmits requests to the shared access circuit. Response data from the shared access circuit is buffered in read data buffer 39 and read from this read data buffer 39 by the processor. Second read request buffer 36, second write request buffer 37 output requests independently of first read request buffer 31, first write request buffer 32. Thus, the degree of filling of second read request buffer 36 and second write request buffer 37 may be less than that of the corresponding first buffers, if the shared access circuit handles requests more quickly than the simulation by resource simulation circuit 35.

It should be noted that stall signal generator 33 generates stall signals independent of the operation of second read request buffer 36 and second write request buffer 37. Thus, it may be that a stall signal is generated because first read request buffer 31 or first write request buffer 32 is full, even though the corresponding second buffers are not full. It should also be noted that response data may arrive in read data buffer 39 before resource simulation circuit 35 indicates that the response data arrives. In this case read data buffer 39 buffers the response data at least until resource simulation circuit 35 indicates that the response data has arrived. As in the case of FIG. 1, resource simulation circuit 35 is configured to use an allocation scheme to generate its simulated performance, the allocation scheme being configured to comply with worst-case performance by shared access circuit 12.

In this way the stall signals are made independent of the actual operation of shared access circuit. As a result timing of execution of each processor does not depend on the other processors, although it may depend on the data values used by the processor. In an image compression process for example, an image content dependent search time may be used to find matching image parts for motion encoding. The search may result in various data dependent stall signals at the processor that performs the search, but the stall signals at the other processors are not influenced.

It should be appreciated that any type of request buffer circuit may be used. Instead of read and write buffers a single request buffer may be used, or more than two buffers may be used to buffer requests of more than two different priority level. As another example, in the circuit of FIG. 3 a read bypass circuit may be added to respond to read requests by copying data for the relevant address from the write request buffer. Such a bypass circuit may be included between the first buffers and/or between the second buffers. Thus in different embodiment bypass data may come from the first or second write buffer. Similarly, different criteria may be used for giving priority to requests. For example write requests may be given priority over read requests once the write buffer is full, or filled above a threshold.

Shared access circuit 14 may implement any resource allocation scheme. In a simple embodiment a cycle of accesses is used wherein each processor receives a predetermined number of slots. In this embodiment the each resource simulation circuit may simulates the shared access circuit by delaying the response to each request by the duration of the cycle. In another embodiment shared access circuit may use more complicated schemes, such as a scheme wherein requests from one processor are processed immediately provided that no more than a predetermined number of requests from the processor are received in a cycle and with a delay of at most one allocation slot if more requests are received from the processor.

Shared access circuit 14 may be configured to service requests from different processors in different ways, for example by reserving more allocation slots for one of the processors than for another, or by guaranteeing a response within fewer slots for requests from one processor than from an other. In this case the resource simulation circuits 22, 35 for different processors may be correspondingly different.

In an embodiment, both shared access circuit 14 and processor specific access circuit 12 may perform arbitration of the requests. The arbitration performed by each processor specific access circuit 12 is independent of the arbitration performed by other processor specific access circuits 12.

Each processor may execute a single process. In this case the timing of execution of all processes is independent of the timing of the execution of other processes. In an embodiment the process of a processor may comprise a plurality of sub-processes. In this embodiment the sub-processes may affect each other's timing, but they remain unaffected from processes in other processors.

In a further embodiment respective process specific access circuits similar to the described processor specific access circuits may be used for respective (sub-) processes that run on a common processor. In this way the resource access related timing of the sub-processes can be made mutually independent. Preferably, such sub-processes are also given predetermined shares of execution time on their common processor. In this way the resource access related timing of the sub-processes can be made mutually independent.

In a further embodiment, further processors or processes may be coupled to access circuit 12 that do not use resource specific access circuits of the type described, so that their access timing may depend on other processors or processes. These further processors or processes may be used for tasks for which the average execution time does not need to be predictable. When processors 10 and further processes are used, at least one of the processors 10 is provided with stall signals by a processor specific access circuit as described.

Although embodiments have been shown wherein a pair of copies of request buffers are used in the processor specific access circuit in combination with a source simulation circuit, it should be appreciated that instead a request handling simulation circuit may be used that simulates the effect of buffering without actually using buffers. The use of buffers has the advantage that the timing of the stall signals related to the execution of a request from a processor may be simulated when they depend on later received requests from that processor. When this is not necessary the request handling simulation circuit may for example maintain one or more counts representing the occupation of simulated buffers, instead of actually simulating the buffers themselves in order to compute whether a stall signal is needed. In another embodiment the request handling simulation circuit may for example count time until the last previous request is simulated to have progressed so far that a next request can be accepted without generating a stall signal.

Although embodiments have been shown wherein completely, or almost completely separate circuits are used to generate stall signals and to handle requests, it should be appreciated that these circuits may overlap to a greater degree, as long as the timing of the generation of stall signals for each processor is kept independent of timing aspects that depend on request from other processors. Also buffers for actually handling the requests may be part of the shared access circuit 14. Shared access circuit 14 and processor specific access circuit may be considered as an overall access circuit, in which the various functions can be distributed in different ways.

In each case the overall access circuit produces stall signals at time points that are a predefined function of the received access requests from a single processor 10 or process and their timing. This predefined function for generating stall signals does not depend on whether actual handling of the requests makes stalling necessary, although the predefined function is selected so that the stall signals cover all cases where a stall is necessary by actual handling of the requests. As shown in the exemplary embodiments this predefined function may be implemented by means of a simulation circuit that simulates access by a simulated access circuit that handles access requests without requests from other processors or processes. However, alternatively other simulation circuits, such as a processor programmed to perform the simulation, or a circuit to compute this predefined function may be used.

The invention claimed is:

1. A multiprocessing system, comprising:
a process execution circuit configured to execute a plurality of processes concurrently and to issue requests to access a shared resource of the multiprocessing system from the plurality of processes;
a shared access circuit coupled to the shared resource and configured to arbitrate conflicts arising from handling concurrent requests to access the shared resource by sequencing conflicting requests;
a simulating access circuit coupled between the process execution circuit and the shared access circuit for receiving requests from the plurality of processes and comprising at least a first buffer for buffering the requests, wherein the simulating access circuit is configured to:
send the requests to the shared access circuit for handling;
generate stall signals to the process execution circuit to stall at least one of the plurality of processes at respective simulated stall time points selected as a predetermined function based on an access speed model or a history of requests from the at least one process, wherein the stall signals are generated independent of the actual handling of the requests from the at least one process by the shared access circuit and irrespective of whether the stalling is made necessary by sequencing conflicting requests between the requests from the at least one process and other requests, and wherein the stall signals are further generated when the first buffer is full and additional requests are received by the simulating access circuit or when a response to a request from the at least one process is not yet available.

2. The multiprocessing system according to claim 1, wherein the simulating access circuit further comprises one or more additional buffers for buffering the requests from the plurality of processes, and a distributor for sending the requests to the first buffer or the one or more additional buffers dependent on a priority associated with the requests, and wherein the simulating access circuit is configured to select the simulated stall time points as a function of simulated responses to requests that are concurrently buffered in the first buffer or the one or more additional buffers.

3. The multiprocessing system according to claim 1, wherein the simulating access circuit further comprises a response buffer for buffering at least one response to requests handled by the shared access circuit until a delivery time point selected by the simulating access circuit and/or their timing from the at least one process.

4. The multiprocessing system according to claim 1, further comprising one or more additional simulating access circuits, each configured to generate stall signals to stall respective one or more processes at respective simulated stall time points selected as a predetermined function based on an access speed model or a history of requests from the one or more processes, wherein the stall signals are generated independent of the actual handling of requests from the one or more processes and irrespective of whether the stalling is made necessary by sequencing conflicting requests between the requests from the one or more processes and other requests.

5. The multiprocessing system according to claim 4, wherein different predetermined functions are used by different simulating access circuits.

6. The multiprocessing system according to claim 1, wherein the shared access circuit is configured to guarantee handling of oldest pending requests or highest priority pending requests from each of the plurality of processes within a predetermined time interval from receiving the relevant request.

7. The multiprocessing system according to claim 1, further comprising the shared resource.

8. The multiprocessing system according to claim 7, wherein the shared resource is memory shared by the plurality of processes.

9. The multiprocessing system according to claim 1, wherein the simulating access circuit further comprises one or more additional buffers for buffering the requests from the plurality of processes, and wherein the stall signals are generated independent of the operation of the one or more additional buffers.

10. The multiprocessing system according to claim 1, wherein the simulating access circuit further comprises one or more additional buffers for buffering the requests from the plurality of processes, and wherein the stall signals are generated when the first buffer is full and the one or more additional buffers are not full.

11. A method of concurrently executing a plurality of in a multiprocessing system, the method comprising:
    issuing requests to access a shared resource of the multiprocessing system from the plurality of processes;
    receiving and buffering the requests in a first buffer;
    sending the requests for handling;
    arbitrating conflicts arising from handling concurrent requests to access the shared resource by sequencing conflicting requests;
    generating stall signals to stall at least one of the plurality of processes at respective simulated stall time points selected as a predetermined function based on an access speed model or a history of requests from the at least one process, wherein the stall signals are generated independent of the actual handling of the requests from the at least one process and irrespective of whether the stalling is made necessary by sequencing conflicting requests between the requests from the at least one process and other requests, and wherein the stall signals are further generated when the first buffer is full and additional requests are received or when a response to a request from the at least one process is not yet available.

12. The method according to claim 11, further comprising generating requests dependent on the value of input data of the at least one of the plurality of processes, so that the number of the requests to the input data depends on the input data.

13. The method according to claim 11, further comprising buffering the requests from the plurality of processes in one or more additional buffers, and wherein the stall signals are generated independent of the operation of the one or more additional buffers.

14. The method according to claim 11, further comprising buffering the requests from the plurality of processes in one or more additional buffers, and wherein the stall signals are generated when the first buffer is full and the one or more additional buffers are not full.

15. A method of concurrently executing a plurality of processes in a multiprocessing system, the method comprising:
    issuing requests to access a shared resource of the multiprocessing system from the plurality of processes;
    receiving and buffering the requests in a first buffer and a second buffer;
    sending the requests for handling;
    arbitrating conflicts arising from handling concurrent requests to access the shared resource by sequencing conflicting requests;
    generating stall signals to stall at least one of the plurality of processes at respective simulated stall time points selected as a predetermined function based on an access speed model or a history of requests from the at least one process, wherein the stall signals are generated independent of the operation of the second buffer and irrespective of whether the stalling is made necessary by sequencing conflicting requests between the requests from the at least one process and other requests, and wherein the stall signals are further generated when the first buffer is full and additional requests are received or when a response to a request from the at least one process is not yet available.

* * * * *